US011172118B2

(12) United States Patent
Chino et al.

(10) Patent No.: US 11,172,118 B2
(45) Date of Patent: Nov. 9, 2021

(54) CONTROL APPARATUS, IMAGE CAPTURING APPARATUS, CONTROL METHOD, AND NON-TRANSITORY COMPUTER-READABLE STORAGE MEDIUM (71) Applicant: CANON KABUSHIKI KAISHA, Tokyo (JP)

(72) Inventors: Shunsuke Chino, Wako (JP); Toshiyuki Dobashi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/569,941

(22) Filed: Sep. 13, 2019

(65) Prior Publication Data
US 2020/0099851 A1 Mar. 26, 2020

(30) Foreign Application Priority Data
Sep. 21, 2018 (JP) .............................. JP2018-177576

(51) Int. Cl.
*H04N 5/232* (2006.01)
(52) U.S. Cl.
CPC ............................... *H04N 5/23212* (2013.01)
(58) Field of Classification Search
CPC ......... H04N 5/23212; H04N 5/232127; G02B 7/28; G02B 7/36; G02B 13/36
See application file for complete search history.

(56) References Cited

U.S. PATENT DOCUMENTS

| 6,268,885 B1* | 7/2001 | Ohta ..................... G02B 7/102 348/335 |
| 2001/0038418 A1 | 11/2001 | Suda et al. |
| 2004/0201770 A1 | 10/2004 | Sawachi |
| 2008/0218611 A1 | 9/2008 | Parulski et al. |
| 2009/0051805 A1 | 2/2009 | Pan |
| 2009/0102960 A1 | 4/2009 | Tsuchiya |
| 2015/0189155 A1* | 7/2015 | Umezawa .......... H04N 5/23212 348/345 |
| 2015/0227023 A1* | 8/2015 | Hamano ................ H04N 5/144 348/169 |

FOREIGN PATENT DOCUMENTS

JP     2009-103912 A     5/2009

OTHER PUBLICATIONS

Search Report dated Dec. 12, 2019, in European Patent Application No. 19197799.0.

* cited by examiner

*Primary Examiner* — Yogesh K Aggarwal
(74) *Attorney, Agent, or Firm* — Venable LLP (57) ABSTRACT

A control apparatus (100) includes a divider (7) that divides an image into a plurality of areas, a calculator (8) that calculates an evaluation value of each of the plurality of areas, and a focus adjuster (10) that performs focusing based on the evaluation value of each of the plurality of areas.

11 Claims, 12 Drawing Sheets

CONTROL APPARATUS, IMAGE CAPTURING APPARATUS, CONTROL METHOD, AND NON-TRANSITORY COMPUTER-READABLE STORAGE MEDIUM

BACKGROUND OF THE INVENTION

Field of the Invention

The present invention relates to an image capturing apparatus, and more particularly to an image capturing apparatus that captures an image while fixing a focus position with manual focusing (MF).

Description of the Related Art

Conventionally, for an object that is difficult to be focused by auto focus (AF), image capturing may be performed while fixing a focus position by manual focus (MF). On the other hand, the focus position changes depending on a change in environment (image capturing state) such as temperature and humidity. For this reason, when the environment changes, there is a possibility that the image capturing cannot be performed while focusing on an intended object.

Figure 1:
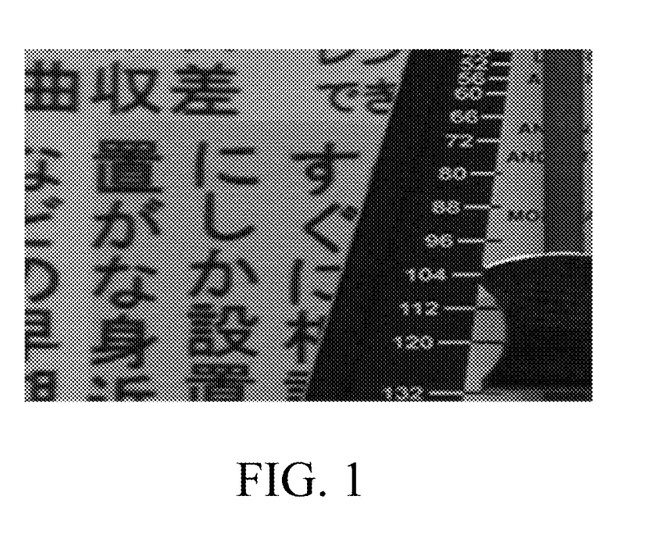
FIG. 1 is a reference view of an image focused on a front side.
Figure 2:
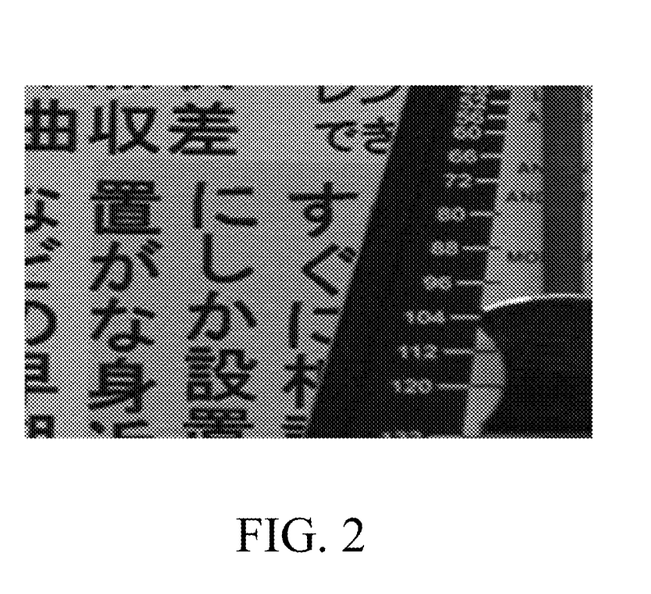
FIG. 2 is a reference view of an image focused on a back side.

If the environment changes while an image is being captured by MF, for example, the image can be refocused by AF. However, in this case, depending on a frame position of AF or an object position, there is a possibility that an object different from the intended object may be in focus. FIG. 1 is an image focused on a metronome in front. If focusing is performed by AF when the focus is shifted due to the change in the environment from the state of the image illustrated in FIG. 1, there is a possibility that a back chart will be in focus as illustrated in FIG. 2. In order to avoid such a situation, Japanese Patent Laid-Open No. 2009-103912 discloses an image capturing apparatus that performs determination by dividing an image into a plurality of areas.

However, in the image capturing apparatus disclosed in Japanese Patent Laid-Open No. 2009-103912, an area determined to be in focus first is selected to focus. For this reason, when the image capturing state changes, such as when a temporary object enters an area or when a peak position is lost due to noise or the like, focusing may be performed on an object different from the intended object.

SUMMARY OF THE INVENTION

The present invention provides a control apparatus, an image capturing apparatus, a control method, and a non-transitory computer-readable storage medium which are capable of acquiring an image in which an intended object is in focus even when an image capturing state is changed.

A control apparatus as one aspect of the present invention includes a divider configured to divide an image into a plurality of areas, a calculator configured to calculate an evaluation value of each of the plurality of areas, and a focus adjuster configured to perform focusing based on the evaluation value of each of the plurality of areas.

An image capturing apparatus as another aspect of the present invention includes an image sensor configured to photoelectrically convert an optical image formed via an image capturing optical system, and the control apparatus.

A control method as another aspect of the present invention includes dividing an image into a plurality of areas, calculating an evaluation value of each of the plurality of areas, and performing focusing based on the evaluation value of each of the plurality of areas.

A non-transitory computer-readable storage medium as another aspect of the present invention stores a program causing a computer to execute the control method.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First Embodiment

Figure 3:
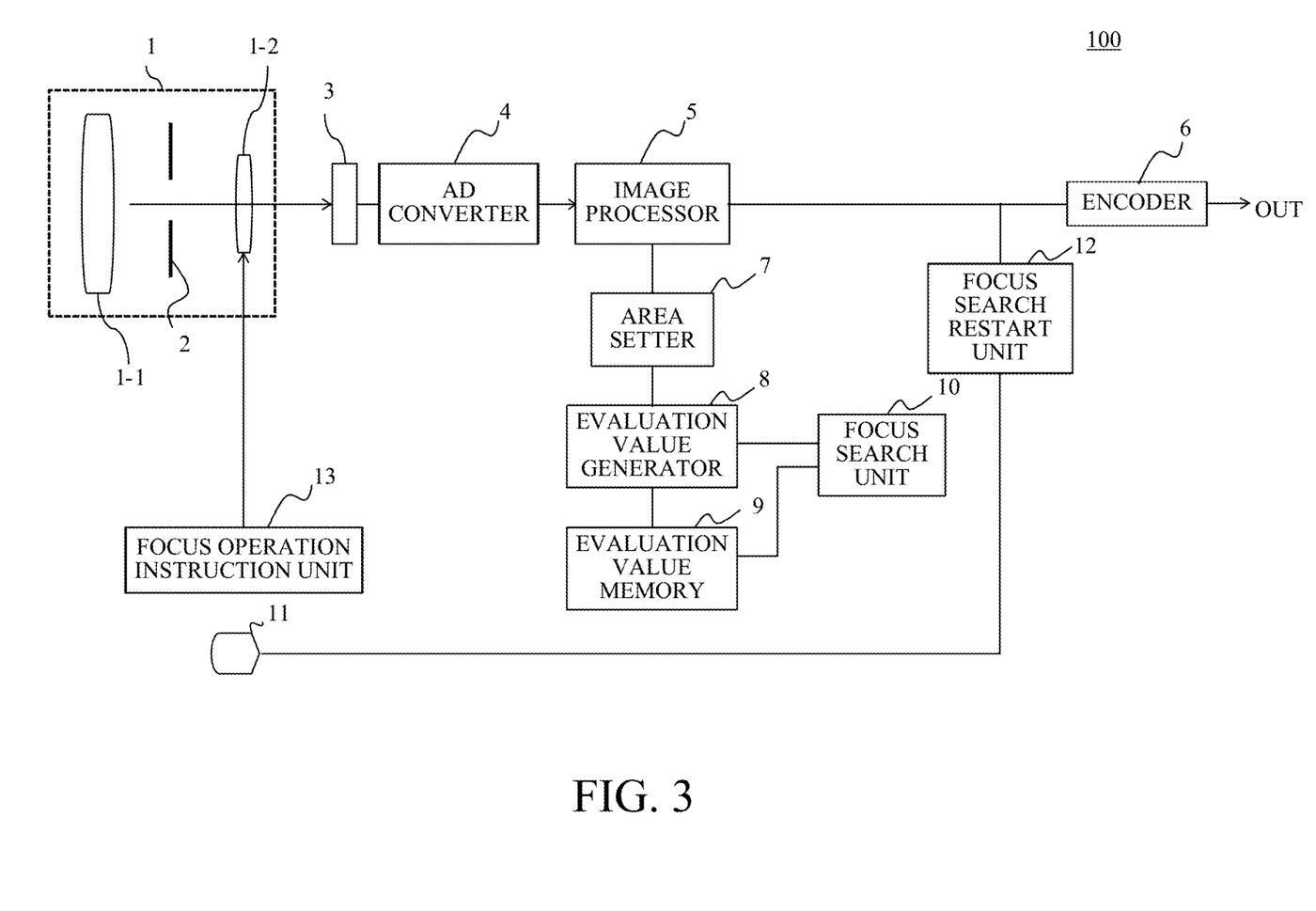
FIG. 3 is a block diagram of an image capturing apparatus in a first embodiment.

First, referring to FIG. 3, the configuration of an image capturing apparatus in a first embodiment of the present invention will be described. FIG. 3 is a block diagram of an image capturing apparatus 100 in this embodiment.

A lens unit (image capturing optical system) 1 is used to adjust a focal length or a focus position. The lens unit 1 includes an objective lens 1-1, an aperture stop 2, and a focus lens 1-2 that are arranged in a direction along an optical axis OA. An image sensor 3 receives light transmitted through the lens unit 1 to output an image signal. That is, the image sensor 3 performs photoelectric conversion on an optical image (object image) formed via the lens unit 1 to output the image signal. An AD converter 4 performs AD conversion on the image signal (analog signal) output from the image sensor 3 to be converted into a digital signal. The digital signal output from the AD converter 4 is input to an image processor 5. The image processor 5 performs image processing such as demosaicing, development processing, gamma processing, and sharpness processing on the digital signal to output image data. An encoder 6 compresses the image data output from the image processor 5 into JPEG or H.264 to be output to an external apparatus.

An area setter (divider) 7 divides a captured image (image signal output from the image processor 5) into a plurality of areas. The image signal for area division may be either RGB before development or YCrCb after development. An evaluation value generator (calculator) 8 generates (calculates) an evaluation value (focus evaluation value, or AF evaluation value) for each of the areas divided by the area setter 7. The focus evaluation value is a contrast of the image signal in each area, and a peak position of the contrast corresponds to an in-focus position.

An evaluation value memory (memory) 9 stores a plurality of areas with high focus evaluation values among the focus evaluation values output from the evaluation value generator 8. The area in which the focus evaluation value is to be stored is an area in which a plurality of objects exist and areas having high focus evaluation values can be selected by the predetermined number from the higher one. Alternatively, one or a plurality of focus evaluation values that are not less than a predetermined threshold value may be stored instead of being determined by the number.

A focus search unit (focus adjuster) 10 uses a current focus evaluation value for each area generated by the evaluation value generator 8 and the focus evaluation value stored in the evaluation value memory 9 to perform focusing (focus adjustment). The focus search unit 10 calculates a local peak position based on the magnitude relationship between the focus evaluation values of the plurality of areas stored in the evaluation value memory 9 and the focus evaluation values of the plurality of areas generated by the evaluation value generator 8 to perform the focusing. Alternatively, the focus search unit 10 may perform control such that a ratio of the focus evaluation values of the plurality of areas generated by the evaluation value generator 8 approaches a ratio of the plurality of focus evaluation values stored in the evaluation value memory 9 (that is, such that the ratio of the focus evaluation values of the plurality of areas generated by the evaluation value generator 8 is within a predetermined range, or preferably coincident with the ratio of the plurality of focus evaluation values stored in the evaluation value memory 9).

A temperature sensor (detector) 11 detects the temperature of the outside air or the internal temperature of the image capturing apparatus 100. A focus search restart unit 12 instructs the focus search unit 10 to perform focusing in accordance with changes in the temperature sensor 11, brightness Y obtained from the image processor 5, a humidity sensor (not illustrated), or the like. A focus operation instruction unit 13 instructs the focus lens 1-2 to perform focusing or manual focus operation according to a user's instruction or the like to drive the focus lens 1-2. The focus operation instruction unit 13 is a focus position fixing unit that fixes the focus position. The evaluation value memory 9 stores a focus evaluation value in the focus operation.

Figure 4:
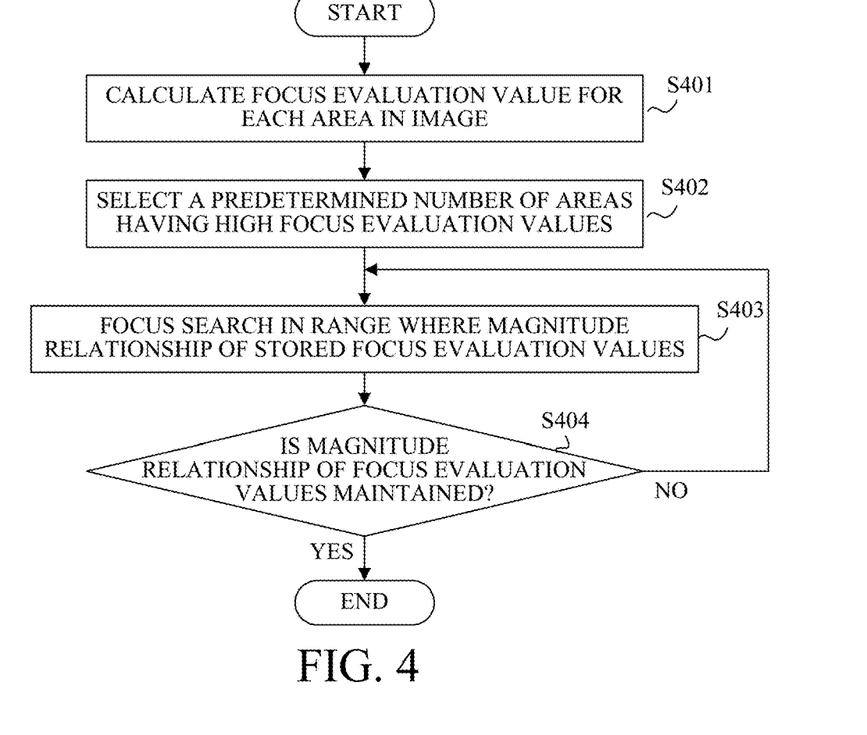
FIG. 4 is a flowchart illustrating a focusing process in the first embodiment.

Next, referring to FIG. 4, the focusing process (focus adjustment) in this embodiment will be described. FIG. 4 is a flowchart of the focusing process, and it illustrates a method of focusing in a range in which the magnitude relationship of the focus evaluation values stored in the evaluation value memory 9 is maintained. Each step in FIG. 4 is mainly performed by the evaluation value generator 8, the evaluation value memory 9, or the focus search unit 10.

First, in step S401, the evaluation value generator 8 calculates (generates) a focus evaluation value for each area (area of the captured image) in a screen (captured image, or display image) set by the area setter 7. Subsequently, in step S402, the evaluation value memory 9 selects and stores a plurality (predetermined number) of areas having high focus evaluation values among the focus evaluation values generated by the evaluation value generator 8. Subsequently, in step S403, the focus search unit 10 performs a focus search within a range in which the magnitude relationship between the plurality of focus evaluation values stored in the evaluation value memory 9 is maintained. That is, the focus search unit 10 performs focusing while maintaining the magnitude relationship between the focus evaluation value selected from the evaluation value memory 9 and the current focus evaluation value, and calculates a local peak position.

Subsequently, in step S404, the focus search unit 10 determines whether the magnitude relationship between the focus evaluation values of the plurality of areas stored in the evaluation value memory 9 is maintained after focusing. That is, the focus search unit 10 determines whether the magnitude relationship of the focus evaluation values of the plurality of areas after focusing is the same as the magnitude relationship of the focus evaluation values of the plurality of areas stored in the evaluation value memory 9. When the magnitude relationship of the focus evaluation values stored in the evaluation value memory 9 is maintained, this flow (focus search operation) is ended. On the other hand, when the magnitude relationship of the focus evaluation values stored in the evaluation value memory 9 is not maintained (that is, when the magnitude relationship of the focus evaluation values changes), the process returns to step S403 and the focus search unit 10 performs focusing again. When the magnitude relationship of the focus evaluation values stored in the evaluation value memory 9 cannot be maintained even if the process is repeated a predetermined number of times or more, the focus search unit 10 determines that focusing cannot be performed, and the process may return to S401 or step S402.

Figure 5:
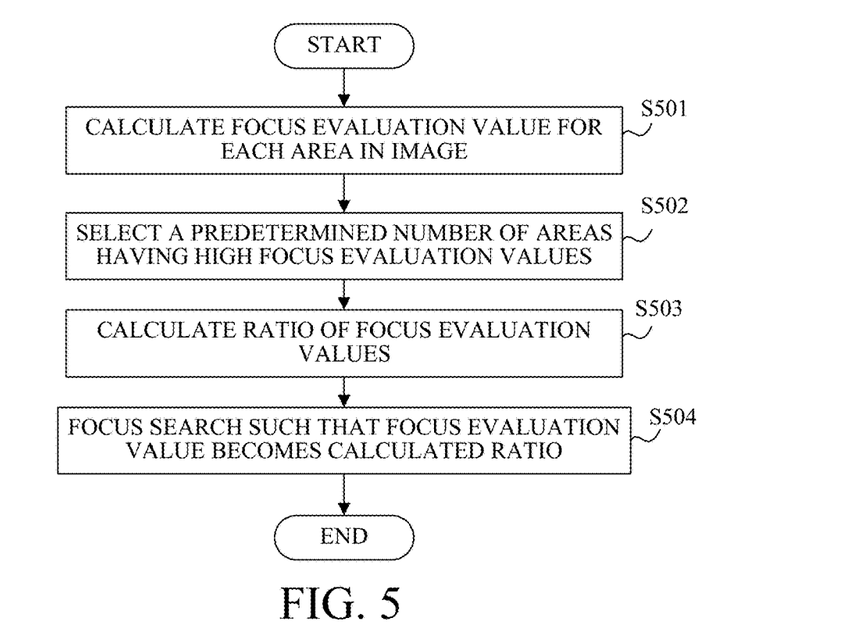
FIG. 5 is a flowchart illustrating the focusing process in the first embodiment.

Next, referring to FIG. 5, the focusing process (focus adjustment) in this embodiment will be described. FIG. 5 is a flowchart of the focusing process, and it illustrates a method of performing focusing while maintaining a ratio of the focus evaluation values stored in the evaluation value memory 9. Each step in FIG. 5 is mainly performed by the evaluation value generator 8, the evaluation value memory 9, or the focus search unit 10.

First, in step S501, the evaluation value generator 8 calculates (generates) a focus evaluation value for each area (area of the captured image) in a screen (captured image, or display image) set by the area setter 7. Subsequently, in step S502, the evaluation value memory 9 selects and stores a plurality (predetermined number) of areas having high focus evaluation values among the focus evaluation values generated by the evaluation value generator 8. Subsequently, in step S503, the focus search unit 10 calculates the ratio of the focus evaluation values of the plurality of areas selected from the evaluation value memory 9.

Subsequently, in step S504, the focus search unit 10 performs focusing so that the focus evaluation value becomes the ratio of the focus evaluation values calculated in step S503. That is, the focus search unit 10 performs focusing so that the ratio of the focus evaluation values after focusing and the ratio of the focus evaluation values calculated in step S503 fall within a predetermined range (preferably, so that they coincide with each other). When the focus evaluation value for each of the areas generated by the evaluation value generator 8 changes without a change in temperature or humidity detected by the temperature sensor 11 or the humidity sensor after focusing, the focus search unit 10 may determine that an object has changed, such as movement of a vehicle. In this case, the focus search unit 10 updates the value stored in the evaluation value memory 9.

Second Embodiment

Next, a second embodiment of the present invention will be described. In the first embodiment, when the moving object enters any of areas used for focusing and the state changes, and the magnitude relationship of the focus evaluation values largely breaks, sufficient effects may not be obtained. Therefore, in this embodiment, priorities are given to a plurality of areas, and areas to be used for focusing are selected based on the priorities in accordance with changes in the state of the object. In this embodiment, the same components as those in the first embodiment are denoted by the same reference numerals, and detailed descriptions thereof will be omitted.

Figure 6:
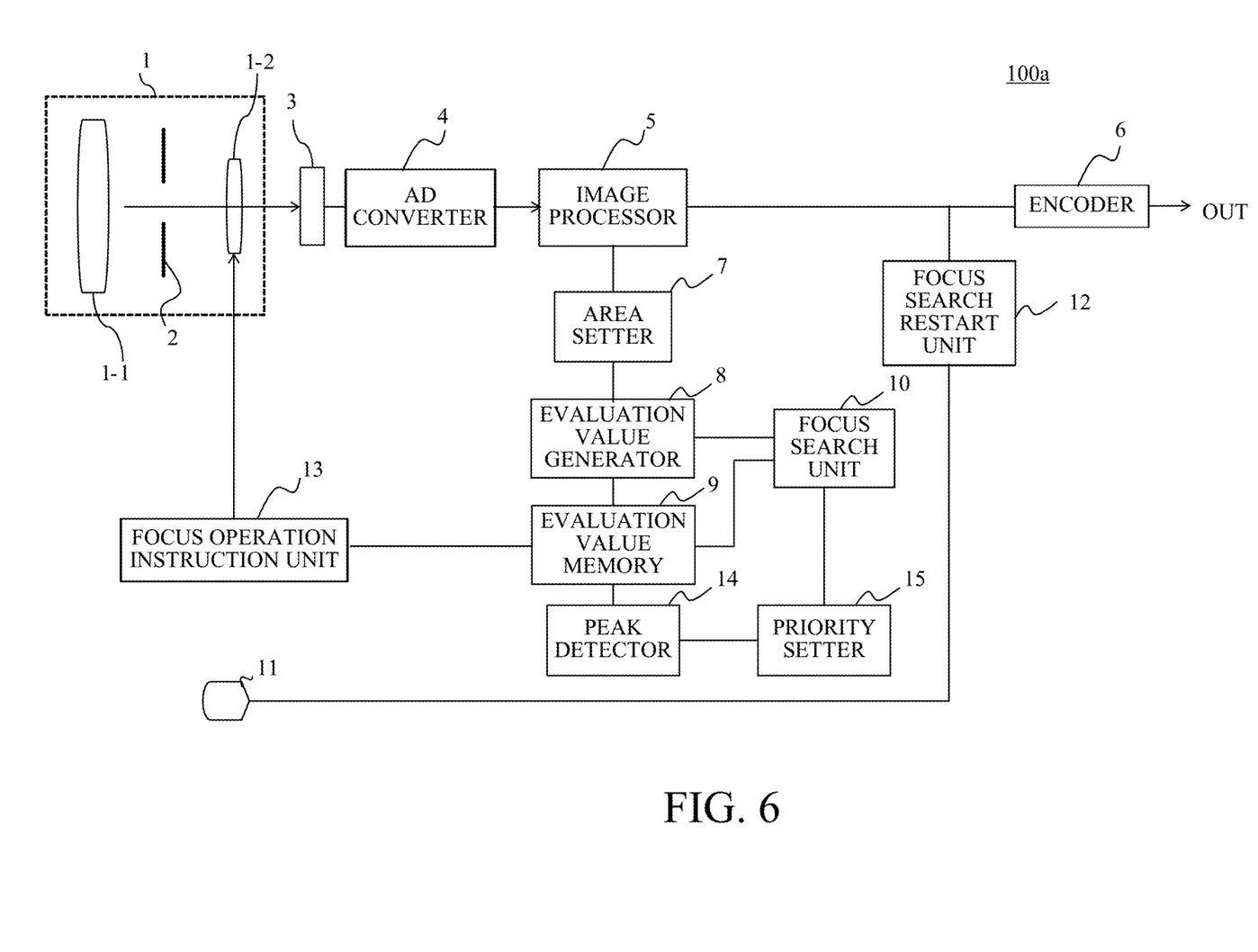
FIG. 6 is a block diagram of an image capturing apparatus in a second embodiment.

First, referring to FIG. 6, the configuration of an image capturing apparatus in this embodiment will be described. FIG. 6 is a block diagram of an image capturing apparatus 100a in this embodiment. The evaluation value memory 9 acquires and stores the focus evaluation value of the area divided by the area setter 7 from the evaluation value generator 8. Unlike the first embodiment, the evaluation value memory 9 stores the focus evaluation value and the focus position acquired from the focus search unit 10 or the focus operation instruction unit 13 in association with each other. A peak detector 14 detects a peak position of the focus evaluation value stored in the evaluation value memory 9 and evaluates whether focusing is possible. A priority setter 15 calculates a distance between the peak position detected by the peak detector 14 and the current focus position, and sets the priority (order of priority) used for focusing on each area.

Figure 7:
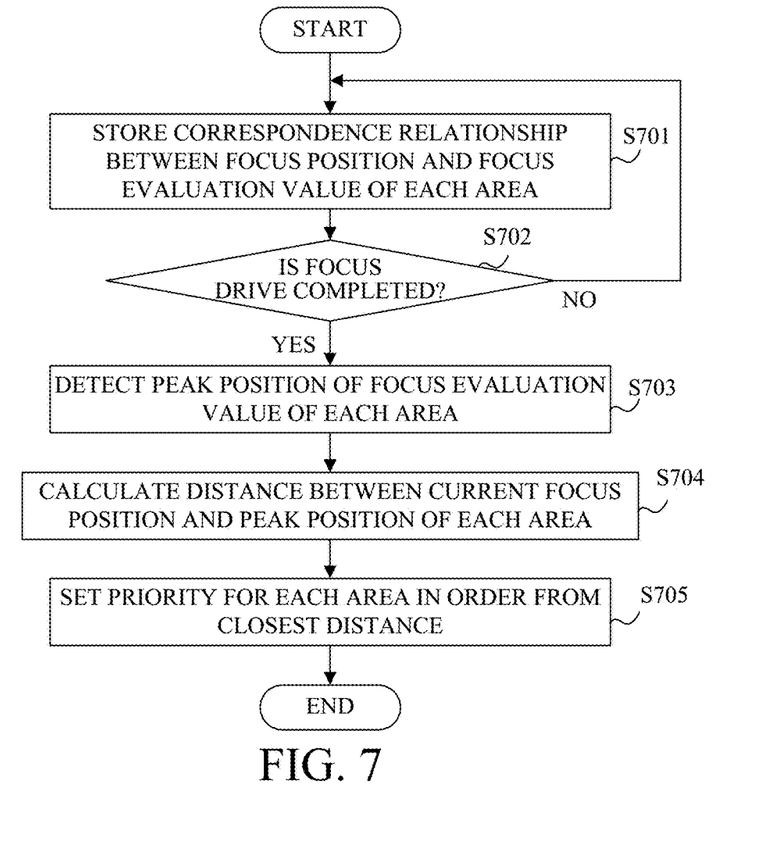
FIG. 7 is a flowchart illustrating a priority setting process of an AF evaluation area in the second embodiment.
Figure 8:
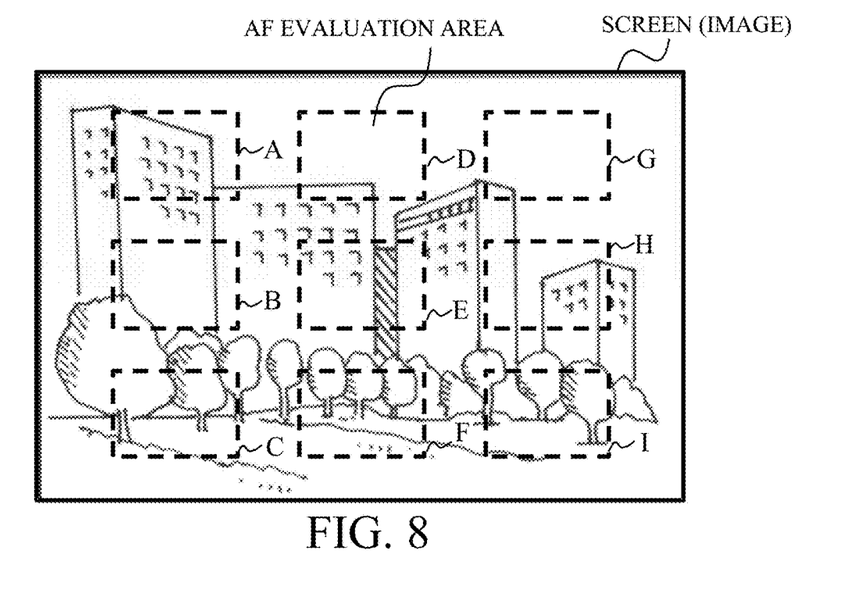
FIG. 8 is an explanatory diagram of the AF evaluation area in the second embodiment.
Figure 9:
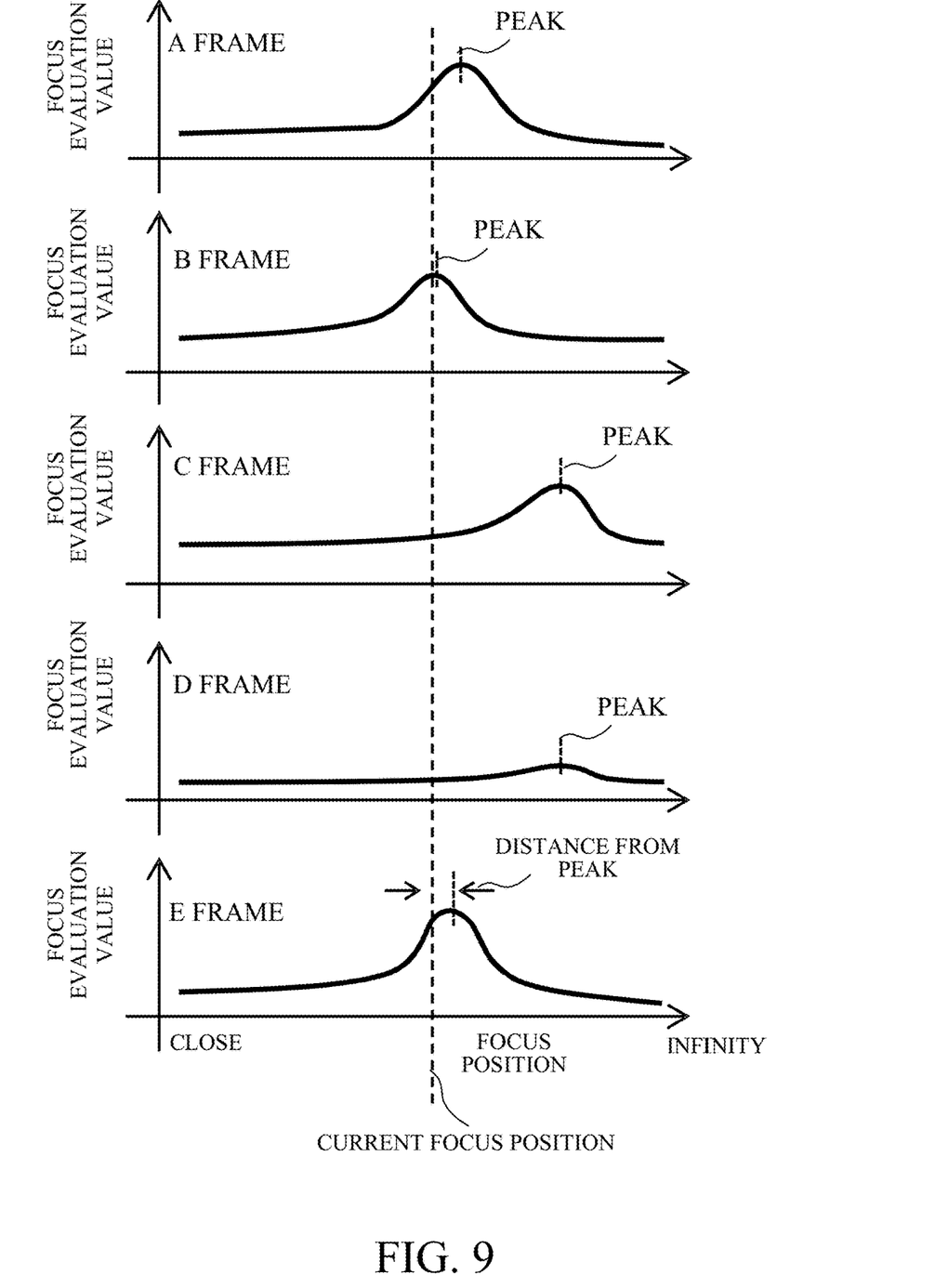
FIG. 9 is an explanatory diagram of a focus evaluation value in the second embodiment.
Figure 10A:
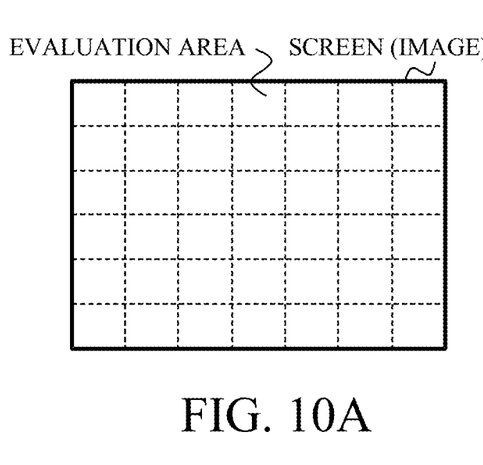
FIGS. 10A to 10C are setting examples of the AF evaluation area in the second embodiment.
Figure 10B:
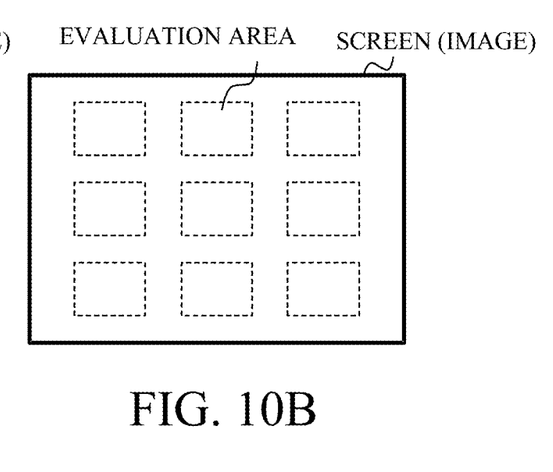
Figure 10C:
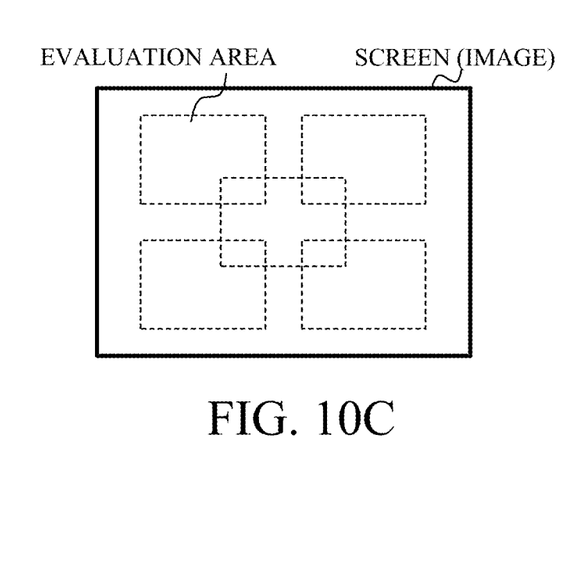

Next, referring to FIGS. 7 to 10C, a priority setting process of areas (AF evaluation areas) in this embodiment will be described. FIG. 7 is a flowchart illustrating the priority setting process of the AF evaluation areas. Each step in FIG. 7 is mainly performed by the evaluation value memory 9, the peak detector 14, or the priority setter 15. FIG. 8 is an explanatory diagram of the AF evaluation areas. FIG. 9 is an explanatory diagram of focus evaluation values. FIGS. 10A to 10C are setting examples of the AF evaluation areas. The flow of FIG. 7 is started by an MF operation or an AF operation by the user. In FIG. 7, in order to simplify descriptions, five areas (A frame to E frame) in the evaluation areas illustrated in FIG. 8 will be described.

First, in step S701 of FIG. 7, the evaluation value memory 9 acquires the focus position and the focus evaluation value of each area from the focus operation instruction unit 13 and the evaluation value generator 8, respectively, and stores the correspondence relationship. FIG. 9 is an example of the correspondence relationship between the focus evaluation value and the focus position in the five areas (A frame to E frame) illustrated in FIG. 8. In FIG. 9, the horizontal axis represents the focus position, and the vertical axis represents the focus evaluation value.

Subsequently, in step S702, the peak detector 14 determines whether the drive (focus drive) of the focus lens 1-2 is completed. When the focus drive is not completed, the process returns to step S701. On the other hand, when the focus drive is completed, the process proceeds to step S703. In the case of the AF control, the determination process of step S702 may be performed based on whether the AF operation is completed. In the case of the MF operation by the user, the peak detector 14 can determine whether a predetermined time has elapsed since the last operation. Alternatively, the peak detector 14 may be provided with a button that notifies the completion of the MF operation on the screen to perform the determination in response to the press of the button by the user. Alternatively, the peak detector 14 may acquire information on whether the drive motor is operating from the lens unit 1 to perform the determination.

Subsequently, in step S703, the peak detector 14 acquires the focus evaluation value of each area (evaluation area) from the evaluation value memory 9, and detects the peak position. The peak position can be detected by using known techniques. For example, the position of the maximum value of the focus evaluation value can be simply used as the peak position. Alternatively, the position of the maximum value among the focus evaluation values exceeding a predetermined threshold value may be used as the peak position.

Subsequently, in step S704, the priority setter 15 calculates the distance between the focus position last set by the user and the peak position of each area detected in step S703. This distance is used to set the priority in the subsequent step S705. Subsequently, in step S705, the priority setter 15 sets priorities (orders of priorities) for the respective areas in order from the closest distance calculated in step S704. That is, the priority setter 15 sets the priority for the area to be higher as the area is closer to the in-focus state. In the example illustrated in FIG. 9, the priority (order of priority) is in order of the B frame, the E frame, the A frame, the C frame, and the D frame.

In step S705 of FIG. 7, it is not necessary to set priorities in all the areas. For example, the priorities may be set only for the area where the distance calculated in step S704 is not greater than a predetermined threshold value. This makes it possible to suppress the focus shift to an object at a distance.

When a plurality of areas having the same peak position exist, it is preferable to set an area having a high focus evaluation value as a high priority or to set an area having a sharp peak in the focus evaluation value as a high priority. Alternatively, the same priority may be set to areas, and an area used for focusing may be appropriately selected according to the distance to the peak position or the like in the focusing process described below.

In this embodiment, the plurality of evaluation areas can be set so as to divide the area on the screen as illustrated in FIG. 10A. Alternatively, the plurality of evaluation areas may be discretely set to an arbitrary position on the screen as illustrated in FIG. 10B, or they may be set to have overlapping areas as illustrated in FIG. 10C.

Figure 11:
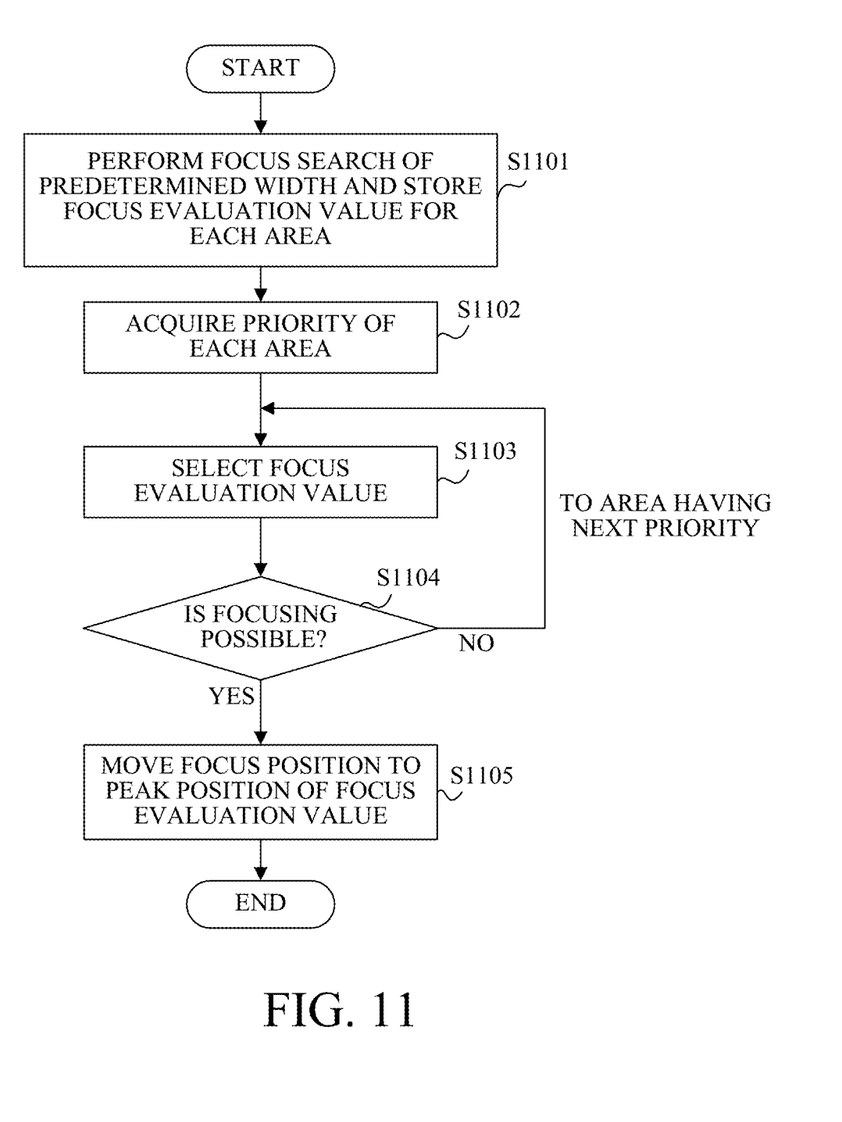
FIG. 11 is a flowchart of a focusing process in the second embodiment.

Next, referring to FIG. 11, a focusing process (focus adjustment) in this embodiment will be described. FIG. 11 is a flowchart of the focusing process. Each step in FIG. 11 is mainly performed by the evaluation value generator 8, the evaluation value memory 9, or the focus search unit 10 at fixed time intervals or every time the temperature changes by a fixed amount.

Figure 12A:
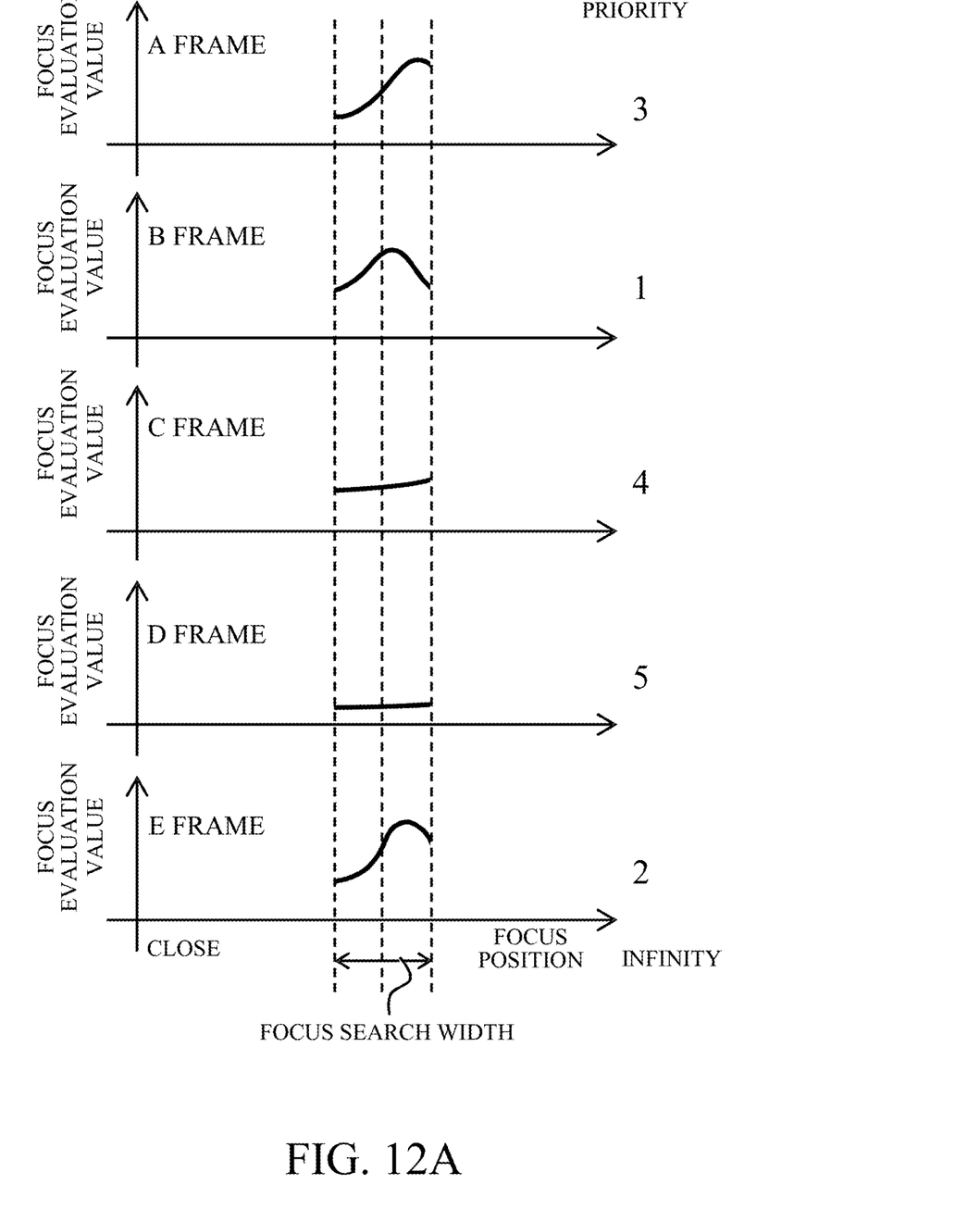
FIGS. 12A and 12B are explanatory diagrams of the focus evaluation value in the focusing process in the second embodiment.

First, in step S1101, the focus search unit 10 performs a focus search of a predetermined width (predetermined focus search width). The predetermined width is determined, for example, such that the amount of focus movement at the time of a temperature change measured in advance is contained. At the same time, the evaluation value memory 9 stores the correspondence relationship between the focus position and the focus evaluation value of each area. FIG. 12A is an example of the correspondence relationship between the focus evaluation value and the focus position in the five areas illustrated in FIG. 8 (A frame to E frame). In FIG. 12A, the horizontal axis represents the focus position, and the vertical axis represents the focus evaluation value.

Subsequently, in step S1102 of FIG. 11, the focus search unit 10 acquires, from the priority setter 15, the priority (order of priority) set to each area. Subsequently, in step S1103, the peak detector 14 selects an area (focus evaluation area) to be used in the evaluation as to whether focusing is possible in the subsequent step S1104 based on the priority acquired in step S1101.

Figure 12B:
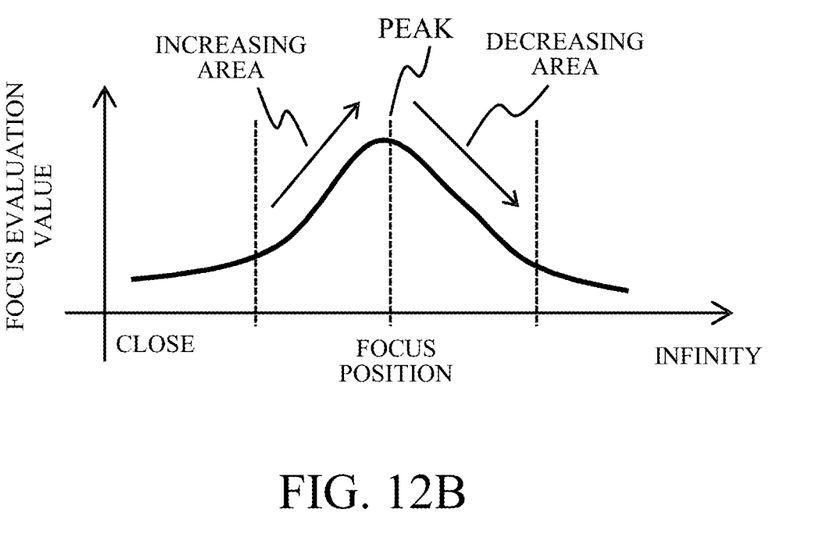

Subsequently, in step S1104, the peak detector 14 determines whether focusing is possible in the focusing evaluation area set (selected) in step S1103. This determination is performed by detecting whether the focus evaluation value has a "mountain". In this embodiment, the peak of the focus evaluation value in the range searched in step S1101 is detected, and it is determined that it has the mountain and that focusing is possible if there are both an area where the focus evaluation value decreases and an area where the focus evaluation value increases in the vicinity of the peak. FIG. 12B illustrates an example of the increasing area and the decreasing area. In FIG. 12B, the horizontal axis represents the focus position, and the vertical axis represents the focus evaluation value.

When it is determined in step S1104 of FIG. 11 that focusing is not possible, the process returns to step S1103 and the peak detector 14 determines whether focusing is possible in an area (focus evaluation area) of the next priority. On the other hand, when it is determined in step S1104 that focusing is possible, the process proceeds to step S1105. In the case of the example illustrated in FIG. 12A, the focus evaluation value of the B frame having the highest priority (order of priority) includes both the increasing area and the decreasing area near the peak. For this reason, the B frame is evaluated as being focusable, and focusing is performed by using the B frame.

Figure 13:
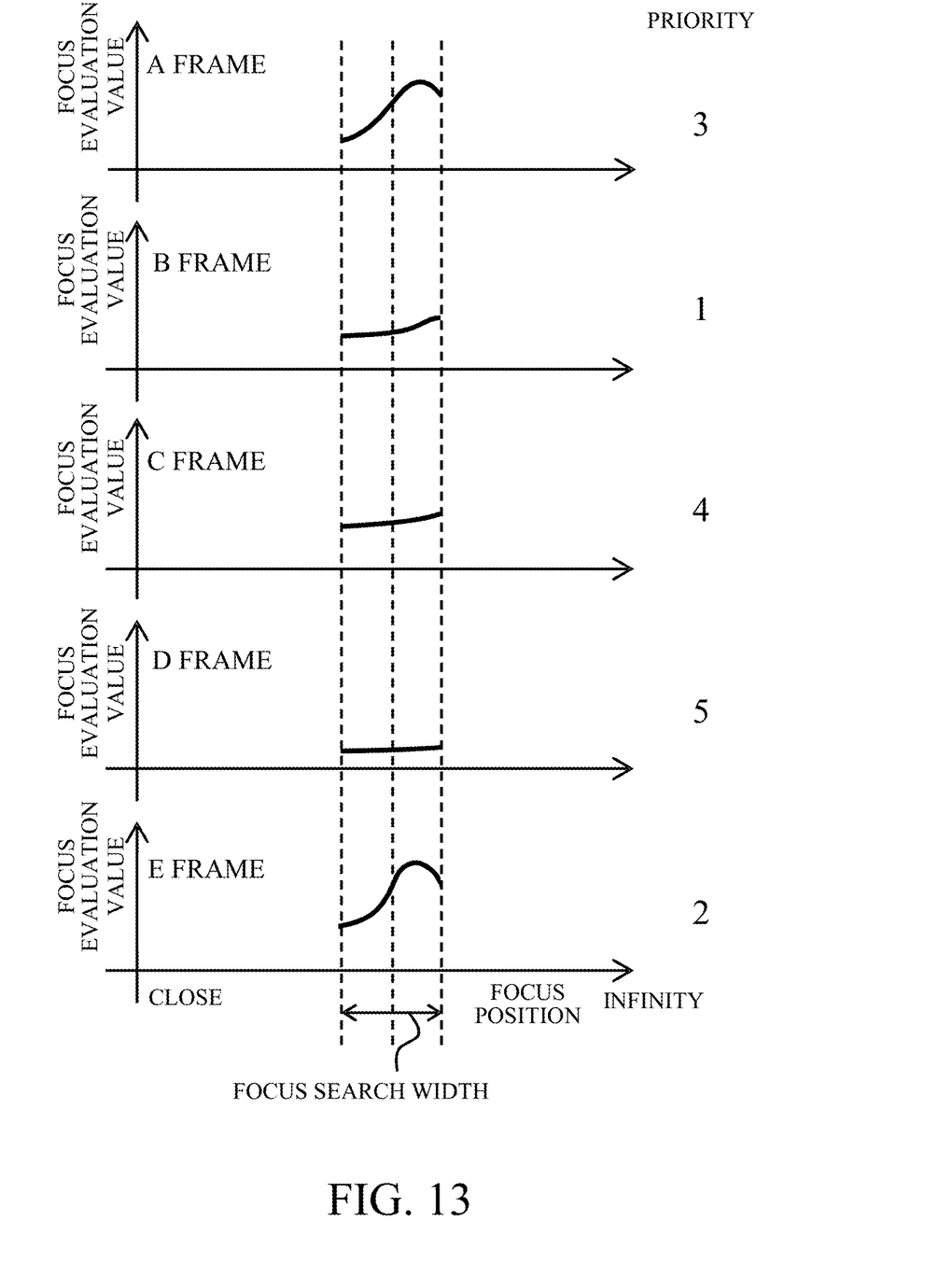
FIG. 13 is an explanatory diagram of the focus evaluation value in the focusing process in the second embodiment.

On the other hand, when a moving object enters the B frame and thus objects are changed, the focus evaluation value varies, for example, as the example illustrated in FIG. 13. FIG. 13 illustrates an example of the correspondence relationship between the focus evaluation value and the focus position in the A frame to the E frame when the focus evaluation value in the B frame varies. In FIG. 13, the horizontal axis represents the focus position, and the vertical axis represents the focus evaluation value. In this case, since the focus evaluation value of the B frame includes only an increasing area (that is, it does not include a decreasing area), it is determined in step S1104 that focusing is impossible. As a result, focusing is performed by using the E frame having the next highest priority. Thus, even when an obstacle such as a moving object is included in the evaluation area, the autofocus (AF) process is performed using the area closest to the in-focus position, so that more robust temperature correction can be performed.

Subsequently, in step S1105 of FIG. 11, the focus operation instruction unit 13 moves the focus position to the peak position of the focus evaluation value of the area determined that focusing is possible in step S1104 to perform focusing. In a situation where the object is dark at night, etc., it may be determined that focusing for all the areas where the priorities are set is impossible and temperature correction by the AF process may not be performed. In this case, it is preferable to measure the focus movement for the temperature variation in advance, and move the focus position by a fixed amount derived from the measured value. Thereby, even in a situation where the temperature correction by the AF process cannot be performed, a certain degree of a correction effect can be obtained. If there is no measured value, the focus position may be returned to the focus position before the focus search in step S1102.

Among the areas where the priorities are given, the area which is determined (evaluated) that focusing is impossible continuously a predetermined number of times in the focusing process may include an object that did not exist at the time of setting the priorities (for example, when the car is parked). In such a case, it is preferable to reset the area so that its priority is low. Thus, the number of times of area selection in the focusing process can be reduced. In this embodiment, while the temperature correction is described as an example, the correction target is not limited to temperature and may be humidity or brightness.

As described above, in each embodiment, the control apparatus (image capturing apparatus 100 or 100a) includes the divider (area setter 7), the calculator (the evaluation value generator 8), and the focus adjuster (focus search unit 10). The divider divides the image (captured image, or display image) into the plurality of areas (evaluation areas). The calculator calculates the evaluation value (focus evaluation value, or AF evaluation value) of each of the plurality of areas. The focus adjuster performs focusing based on the evaluation value of each of the plurality of areas.

Preferably, the control apparatus includes the memory (evaluation value memory 9) that stores the evaluation value of each of the plurality of areas. The focus adjuster performs the focusing so as to maintain the relationship of the evaluation values of the plurality of areas stored in the memory. More preferably, the focus adjuster performs the focusing so as to maintain the magnitude relationship of the evaluation values of the plurality of areas stored in the memory. Preferably, the focus adjuster performs the focusing based on a ratio of the evaluation values of the plurality of areas stored in the memory. More preferably, the focus adjuster performs the focusing so as to maintain the ratio of the evaluation values (that is, so that a variation of the ratio is not greater than a predetermined variation, and more preferably, so that the ratios are coincident with each other). Preferably, the memory stores the evaluation values of a predetermined number of areas having relatively high evaluation values among the plurality of areas divided by the divider. Preferably, the memory stores an evaluation value of an area having an evaluation value not less than a predetermined value among the plurality of areas divided by the divider.

Preferably, the control apparatus includes the detector (for example, temperature sensor 11) that detects a change of the state (environment). The focus adjuster performs the focusing when the detector detects the change of the state. More preferably, the detector detects at least one of temperature, brightness, and humidity. Preferably, the memory updates the evaluation value (stores again the evaluation value) of each of the plurality of areas when a variation of the state is not greater than a predetermined variation and a relationship of the evaluation values is changed (that is, when the magnitude relationship of the evaluation values is changed or the ratio of the evaluation values is changed by not less than a predetermined ratio).

Preferably, the focus adjuster performs the focusing again based on the evaluation value acquired after performing the focusing and the evaluation value stored in the memory. The focus adjuster repeats the focusing based on the evaluation value acquired after performing the focusing and the evaluation value stored in the memory until a predetermined condition (that is, a condition relating to the magnitude relationship of the evaluation values or the change of the ratio) is satisfied. Then, the focus adjuster stops the focusing when the number of times of the focusing exceeds the predetermined number of times. Preferably, the control apparatus includes the peak detector 14 that detects a peak position of the evaluation value, and the priority setter 15 that sets priorities in the plurality of areas. The focus adjuster selects an area (focus evaluation area) where the focusing is to be performed based on the priorities.

Figure 14:
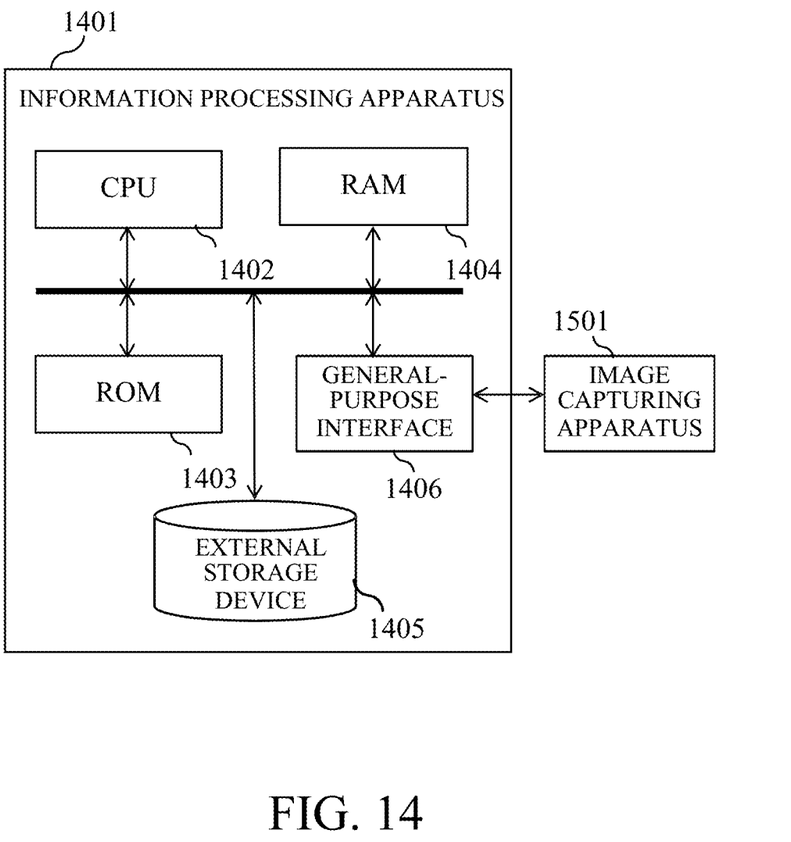
FIG. 14 is a block diagram of an information processing apparatus in each embodiment.

In the embodiments described above, the case where the present invention is realized as a dedicated processing circuit incorporated in the image capturing apparatus is described as an example. However, the present invention can be realized even when the circuit configuration is not necessarily built in the image capturing apparatus. For example, the present invention may be realized using an information processing apparatus independent of the image capturing apparatus by software (computer program). FIG. 14 is a block diagram illustrating a configuration example of an information processing apparatus 1401. The information processing apparatus 1401 is, for example, a personal computer connected to an image capturing apparatus 1501 via a general-purpose interface 1406.

The information processing apparatus 1401 includes a CPU 1402, a ROM 1403, a RAM 1404, an external storage device 1405, and the general-purpose interface 1406. The CPU 1402 controls the overall operation of an entire of the image capturing system using the input data and computer programs stored in the ROM 1403 or the RAM 1404. While the case where the CPU 1402 controls the entire of the information processing apparatus 1401 is described in this embodiment as an example, the entire of the information processing apparatus 1401 may be controlled by sharing processing with a plurality of hardware.

The RAM 1404 includes a memory area that temporarily stores computer programs and data read from the external storage device 1405 and data received from an external device via the general-purpose interface 1406. The RAM 1404 is used as a memory area used by the CPU 1402 to execute various types of processing or a memory area used when the CPU 1402 performs processing. That is, the RAM 1404 can appropriately provide various memory areas. The ROM 1403 stores setting parameters for setting each unit in the information processing apparatus, a boot program, and the like. The external storage device 1405 is a storage device that stores various data, various information, and the like necessary for the CPU 1402 to execute various processes, and is, for example, an HDD or the like. The general-purpose interface 1406 is an interface for communicating with the external device (the image capturing apparatus), and is, for example, a USB interface or the like.

The image capturing apparatus of each embodiment performs focusing using the relationship of evaluation values of a plurality of areas in a captured image (captured screen). Therefore, according to each embodiment, it is possible to provide a control apparatus, an image capturing apparatus, a control method, a program, and a non-transitory computer-readable storage medium which are capable of acquiring an image in which an intended object is in focus even when an image capturing state is changed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-177576, filed on Sep. 21, 2018 which is hereby incorporated by reference herein in its entirety.

What is claimed is:

1. A control apparatus comprising:
   a divider configured to divide an image into a plurality of areas;
   a calculator configured to calculate an evaluation value of each of the plurality of areas;
   a focus adjuster configured to perform focusing based on the evaluation value of each of the plurality of areas;
   a memory configured to store the evaluation value of each of the plurality of areas; and
   a detector configured to detect a change of a state,
   wherein the focus adjuster is configured to perform the focusing so as to maintain a magnitude relationship of the evaluation values of the plurality of areas stored in the memory in a case where the detector detects the change of the state, and
   wherein the memory is configured to update the evaluation value of each of the plurality of areas when a variation of the state is not greater than a predetermined variation and a relationship of the evaluation values is changed.

2. The control apparatus according to claim 1, wherein the focus adjuster is configured to perform the focusing based on a ratio of the evaluation values of the plurality of areas stored in the memory.

3. The control apparatus according to claim 2, wherein the focus adjuster is configured to perform the focusing so as to maintain the ratio of the evaluation values.

4. The control apparatus according to claim 1, wherein the memory is configured to store evaluation values of a predetermined number of areas having relatively high evaluation values among the plurality of areas divided by the divider.

5. The control apparatus according to claim 1, wherein the memory is configured to store evaluation values of areas having the evaluation values not less than a predetermined value among the plurality of areas divided by the divider.

6. The control apparatus according to claim 1, wherein the detector is configured to detect at least one of temperature, brightness, or humidity.

7. The control apparatus according to claim 1, further comprising:
a peak detector configured to detect a peak position of the evaluation value; and
a priority setter configured to set priorities in the plurality of areas,
wherein the focus adjuster is configured to select an area where the focusing is to be performed based on the priorities.

8. A control apparatus comprising:
a divider configured to divide an image into a plurality of areas;
a calculator configured to calculate an evaluation value of each of the plurality of areas;
a focus adjuster configured to perform focusing based on the evaluation value of each of the plurality of areas; and
a memory configured to store the evaluation value of each of the plurality of areas,
wherein the focus adjuster is configured to perform the focusing so as to maintain a magnitude relationship of the evaluation values of the plurality of areas stored in the memory, and
wherein the focus adjuster is configured to:
repeat the focusing based on the evaluation value acquired after performing the focusing and the evaluation value stored in the memory until a predetermined condition is satisfied, and
stop the focusing when a number of times of the focusing exceeds a predetermined number of times.

9. An image capturing apparatus comprising:
an image sensor configured to photoelectrically convert an optical image formed via an image capturing optical system; and
a control apparatus comprising:
(1) a divider configured to divide an image into a plurality of areas,
(2) a calculator configured to calculate an evaluation value of each of the plurality of areas,
(3) a focus adjuster configured to perform focusing based on the evaluation value of each of the plurality of areas,
(4) a memory configured to store the evaluation value of each of the plurality of areas, and
(5) a detector configured to detect a change of a state,
wherein the focus adjuster is configured to perform the focusing so as to maintain a magnitude relationship of the evaluation values of the plurality of areas stored in the memory in a case where the detector detects the change of the state, and
wherein the memory is configured to update the evaluation value of each of the plurality of areas when a variation of the state is not greater than a predetermined variation and a relationship of the evaluation values is changed.

10. A control method comprising:
dividing an image into a plurality of areas;
calculating an evaluation value of each of the plurality of areas;
storing the evaluation value of each of the plurality of areas;
performing focusing based on the evaluation value of each of the plurality of areas; and
detecting a change of a state,
wherein the focusing is performed so as to maintain a magnitude relationship of the stored evaluation values of the plurality of areas in a case where the change of the state is detected, and
wherein the evaluation value of each of the plurality of areas is updated when a variation of the state is not greater than a predetermined variation and a relationship of the evaluation values is changed.

11. A non-transitory computer-readable storage medium which stores a program causing a computer to execute a process comprising:
dividing an image into a plurality of areas;
calculating an evaluation value of each of the plurality of areas;
storing the evaluation value of each of the plurality of areas;
performing focusing based on the evaluation value of each of the plurality of areas; and
detecting a change of a state,
wherein the focusing is performed so as to maintain a magnitude relationship of the stored evaluation values of the plurality of areas in a case where the change of the state is detected, and
wherein the evaluation value of each of the plurality of areas is updated when a variation of the state is not greater than a predetermined variation and a relationship of the evaluation values is changed.

* * * * *